Oct. 21, 1952     F. A. HELFRECHT     2,614,874

FLUID SEAL

Filed May 18, 1948

INVENTOR.
FRED A. HELFRECHT
BY

ATTORNEY.

Patented Oct. 21, 1952

2,614,874

UNITED STATES PATENT OFFICE 2,614,874

FLUID SEAL

Fred A. Helfrecht, Redwood City, Calif., assignor to National Motor Bearing Co., Inc., Redwood City, Calif., a corporation of California Application May 18, 1948, Serial No. 27,740

1 Claim. (Cl. 288—2)

My invention relates to devices for sealing between relatively moving parts and particularly where the sealing is accomplished between contacting radial faces of relatively rotating parts.

The objects of my invention are to provide a construction which lends itself to economical manufacture of the component parts; to provide a structure in which the most delicate part, the sealing face, can be assembled on the job as the sealing device is being installed; to provide a structure by which sub-assemblies can be carried in stock and a sealing face of any particular material or composition can be inserted to complete the sealing device, thereby giving wider flexibility to the stocks on hand or on the dealers' shelves; to provide a structure in which the only part subject to wear can be easily replaced; and to provide a structure in which the telescoping is controlled to keep it out of contact with the shaft.

Other objects and advantages of my invention will become apparent from the drawings and the following description of a preferred form of the device made pursuant to U. S. Revised Statutes Section 4888.

A typical use of the device is in a water pump on one of the present-day automatic clotheswashing machines where a pump is mounted directly on the motor drive shaft and the pump housing is supported on the motor housing. The problem is to provide a foolproof seal to keep the water from getting out of the pump housing into the motor. Another problem is to provide a seal which requires no servicing, especially as the pump is mounted down inside the machine where it is not easily accessible.

Another type of problem is that different face sealing compositions are required for different liquids that are being pumped. By my invention any face sealing composition may be installed at will, thus solving this problem, as well as providing an economy for the manufacturer and the dealers who can carry in stock the basic parts with sealing compositions of several different materials ready to be installed.

Figure 1:
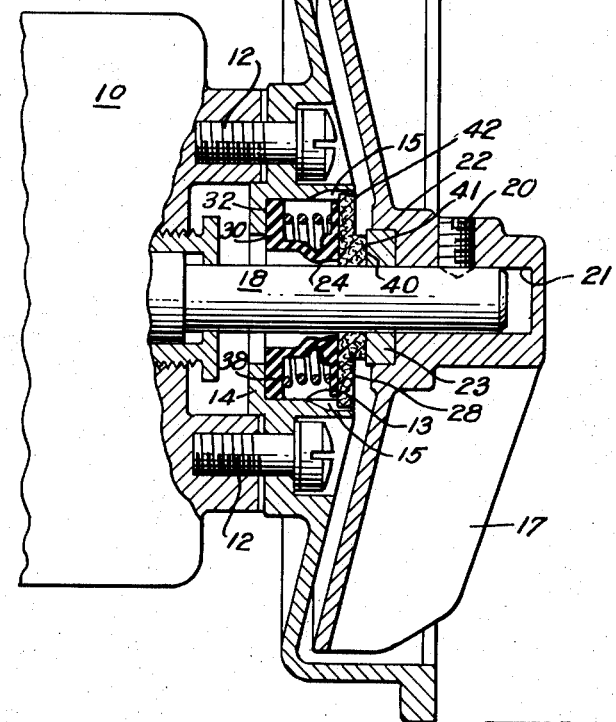
Fig. 1 is a view mostly in section, illustrative of the device installed in a machine.
Figure 2:
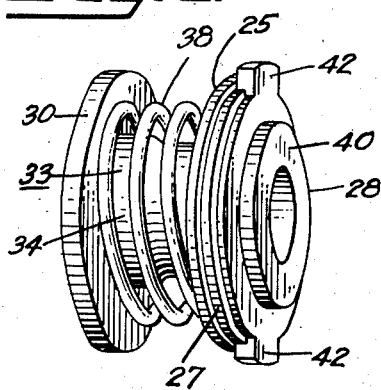
Fig. 2 is a view in perspective.

One form of water pump is shown in Fig. 1 where an end of the motor case 10 is sectioned to show the pump housing 11 secured to it by the screws 12. The inner periphery of the housing 11 has a bore 13 and a flange 14 to receive one end of the sealing device. The bore 13 is slotted at 15 to receive a spline or ear on the sealing device. The outer periphery of the housing 11 is flanged at 16 to receive the other part of the pump housing (not shown) in which the rotor 17 moves. The latter is secured to the driven shaft 18 by a set screw 20, extending into the bore 21. This bore is enlarged at 22 to receive a ring or washer 23 of suitable low friction sealing material. What material is chosen for 23 depends upon the liquid being sealed against. The ring 23 should be a tight enough fit in the bore 22 to prevent any liquid from working in behind it and onto the shaft from whence it could move along the shaft into the motor.

The face sealing device itself consists of a molded body portion 24, U-shaped in cross section having one radial flange 25 with a recess 26 formed by a short axial flange 27 to receive the annular sealing face member 28. The opposite radial flange 30 has a radial sealing face 31 adapted to seal against the radial face 32 at the bottom of the bore 13 against which it abuts. This is usually a non-rotating fit and is shown as nonrotating in Fig. 1.

The flanges 25 and 30 are connected by a tubular membrane 33 of larger diameter than the shaft 18 extending through it, and with a portion 34 of its axial wall enlarged in relation to the balance of the axial wall so that the outside diameter 35 of the latter is substantially the same size as the inside diameter 36 of the larger part 34. Where the flange 25 and the membrane 33 join I prefer to enlarge the membrane as at 37 with a web to provide a centering means for the spring 38. This enlargement 37 also functions to support that part of the membrane 33 lying closest to the shaft and to hold it up out of contact when the membrane is collapsed axially during use.

Figure 3:
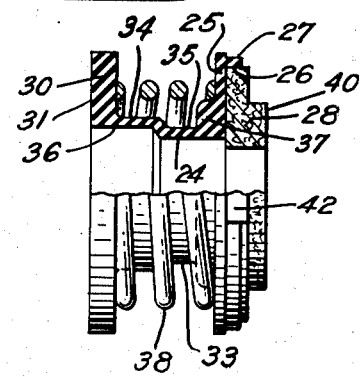
Fig. 3 is a side view of the device partly in section.

The spring 38 is made with a predetermined length, preferably just equal to the axial distance between the facing radial flanges 25 and 30, so that when assembled and before insertion in a machine the parts will appear about as in Fig. 3.

The annular face sealing member 28 may be made from materials such as carbon, brass, stainless steel, etc. By providing the recess 26 the member 28 need not be placed in the mold while the U-shaped member is being cured. Instead it can be put in the recess 26 after molding, where it is held by a suitable cement. During use, if the sealing face 40 becomes cracked, worn down, or needs replacement for any other reason, it is an easy matter to break the flange 25 loose from it and to insert a new one.

Also, as mentioned above, the dealer can carry in stock the sealing unit complete except for the sealing member 28. Also in stock will be an assortment of sealing members 28 of different materials—materials suited to various sealing problems. When the dealer learns from the customer the nature of the sealing problem, the proper sealing member 28 can be supplied ready for insertion.

Another advantage in this feature of construction is that since face seals are efficient in proportion to the perfectness of the two mating faces; the sealing member 28 and the ring 23 can be sold together. Preferably they will have been lapped to assure a perfect fit of the faces 40 and 41.

Another advantage in this feature of construction is that since materials like carbon, etc., are easily broken or scratched in handling, the sealing member 28 can be packaged separately and can be kept packaged until the seal is ready to be installed when it will be put in the recess 26.

This seal functions best when all its parts are kept out of contact with the shaft 18. By having the axial membrane 33 of larger diameter than the shaft and with the portion 34 just larger than the smaller portion of the membrane, the two portions will roll over each other and keep out of contact with the shaft as the flanges 25 and 30 move toward each other.

The face sealing member 28 preferably has ears or splines 42 to fit in the slots 15 in the pump housing 11 to lock the sealing face 40 against rotation. The sealing face 41 on the ring 23 does rotate with the shaft 18 and the pump rotor.

What I claim is:

A self-contained face seal having in the combination an annular member of a rigid material having a smooth outer face adapted to seal against the radial surface of an abutting part; a molded body portion U-shaped in cross-section, having one radial flange recessed to receive said annular member, having its opposite radial flange with a radial outer face adapted to seal against the radial surface of a part spaced from the first named abutting part, and having a connecting tubular membrane of larger diameter than a shaft extending through it with the portion of its axial wall adjacent said opposite flange enlarged in relation to the balance of the axial wall so that the outside diameter of the latter wall is substantially the same size as the inside diameter of the larger part of the wall, said recessed radial flange and the membrane connected to it having a web extending between them to add support to the membrane when it is collapsed axially; and a spring surrounding said tubular membrane and having its ends in engagement with the flange behind said annular member and with said radial flange.

FRED A. HELFRECHT.

REFERENCES CITED

The following references are of record in the file of this patent:

UNITED STATES PATENTS

| Number | Name | Date |
|---|---|---|
| 2,027,505 | Winkler | Jan. 14, 1936 |
| 2,270,651 | Doyle | Jan. 20, 1942 |
| 2,362,363 | Doede | Nov. 6, 1944 |
| 2,402,995 | Garroway | July 2, 1946 |
| 2,403,298 | Payne | July 2, 1946 |
| 2,444,713 | Solari | July 6, 1948 |
| 2,464,988 | Payne | Mar. 22, 1949 |